(12) United States Patent
Wilkinson et al.

(10) Patent No.: US 9,027,031 B2
(45) Date of Patent: May 5, 2015

(54) ALLOWING INTER-PROCESS COMMUNICATION VIA FILE SYSTEM FILTER

(71) Applicant: VMware, Inc., Palo Alto, CA (US)

(72) Inventors: Anthony John Wilkinson, Buckinghamshire (GB); Erik Tatum, Sugar Hill, GA (US)

(73) Assignee: VMware, Inc., Palo Alto, CA (US)

( * ) Notice: Subject to any disclaimer, the term of this patent is extended or adjusted under 35 U.S.C. 154(b) by 68 days.

(21) Appl. No.: 13/652,117

(22) Filed: Oct. 15, 2012

(65) Prior Publication Data

US 2014/0109107 A1  Apr. 17, 2014

(51) Int. Cl.
*G06F 9/54* (2006.01)
*G06F 9/445* (2006.01)
*G06F 21/00* (2013.01)
*G06F 3/00* (2006.01)

(52) U.S. Cl.
CPC ..................... *G06F 9/544* (2013.01)

(58) Field of Classification Search
CPC .......... G06F 17/30212; G06F 21/6218; G06F 17/30067; G06F 2221/2117; G06F 17/30194; G06F 9/545; G06F 17/30091; G06F 17/301; G06F 17/30106; G06F 17/30123; G06F 9/54; G06F 17/30011; G06F 2009/45587; G06F 12/00; G06F 9/544; G06F 13/00; H04W 12/08

See application file for complete search history.

(56) References Cited

U.S. PATENT DOCUMENTS

| | | | |
|---|---|---|---|
| 7,406,603 B1 * | 7/2008 | MacKay et al. | 713/193 |
| 7,640,591 B1 * | 12/2009 | Tripathi et al. | 726/25 |
| 7,958,148 B2 * | 6/2011 | Barnes et al. | 707/783 |
| 2005/0033980 A1 * | 2/2005 | Willman et al. | 713/200 |
| 2005/0235106 A1 * | 10/2005 | Kimura | 711/112 |
| 2005/0283779 A1 * | 12/2005 | Pronk van Hoogeveen et al. | 717/177 |
| 2006/0041593 A1 * | 2/2006 | Borthakur et al. | 707/200 |
| 2006/0059171 A1 * | 3/2006 | Borthakur et al. | 707/100 |
| 2007/0239720 A1 * | 10/2007 | Kumar et al. | 707/9 |
| 2010/0223613 A1 * | 9/2010 | Schneider | 718/1 |

* cited by examiner

*Primary Examiner* — Tuan Dao

(57) ABSTRACT

In one embodiment, a method allows an application running in a first process to communicate with a second process. A file system filter driver receives a command from the application for a file. The file system filter driver is configured to process file system commands. The file system filter driver determines that the command is for an inter-process communication with a service running in the second process based on the command being for the file. Then, the file system filter driver sends the command to the service running in the second process where the command is processed by the service. A response from the service is received based on the command being processed by the service and the file system filter driver sends the response to the application.

20 Claims, 6 Drawing Sheets

ALLOWING INTER-PROCESS COMMUNICATION VIA FILE SYSTEM FILTER

BACKGROUND

Applications running on an operating system may execute inside a strict sandbox where the applications have access to only a limited subset of application programmer interfaces (APIs). For example, the Windows 8™ operating system, by Microsoft, Inc., includes "Metro Apps" that need to be written using a specified subset of APIs. The Metro Apps are meant to be smaller in scope and run faster than traditional desktop applications. These characteristics are partly achieved because of the Metro Apps limited access to APIs as compared to the traditional desktop applications (e.g., word processing applications), which have access to a larger set of APIs.

The strict sandbox may impose restrictions on the Metro Apps for inter-process communication (IPC) mechanisms that are used to communicate with other processes running on the operating system. For example, the strict sandbox restricts all inter-process communications for a Metro App by not allowing access to APIs for inter-process communication. The strict sandbox restricts inter-process communications so that a Metro App does not adversely affect other applications running on the operating system. For example, inter-process communication is used to exchange data between processes, such as a word processing application may want a spreadsheet application to open a file and send data from the file to the word processing application. If inter-process communication is allowed, the word processing application may communicate with the spreadsheet application running in another process to have a file opened and then have data returned to the word processing application. However, opening the file and returning the data may slow other commands being performed by the operating system. Thus, Metro Apps restrict inter-process communication to provide a user experience that runs faster. Also, the operating system may use the strict sandbox for security reasons. For example, not allowing inter-process communications protects other processes from Metro Apps that may not be trustworthy.

SUMMARY

In one embodiment, a method allows an application running in a first process to communicate with a second process. A file system filter driver receives a command from the application for a file. The file system filter driver is configured to process file system commands. The file system filter driver determines that the command is for an inter-process communication with a service running in the second process based on the command being for the file. Then, the file system filter driver sends the command to the service running in the second process where the command is processed by the service. A response from the service is received based on the command being processed by the service and the file system filter driver sends the response to the application.

The following detailed description and accompanying drawings provide a better understanding of the nature and advantages of particular embodiments.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
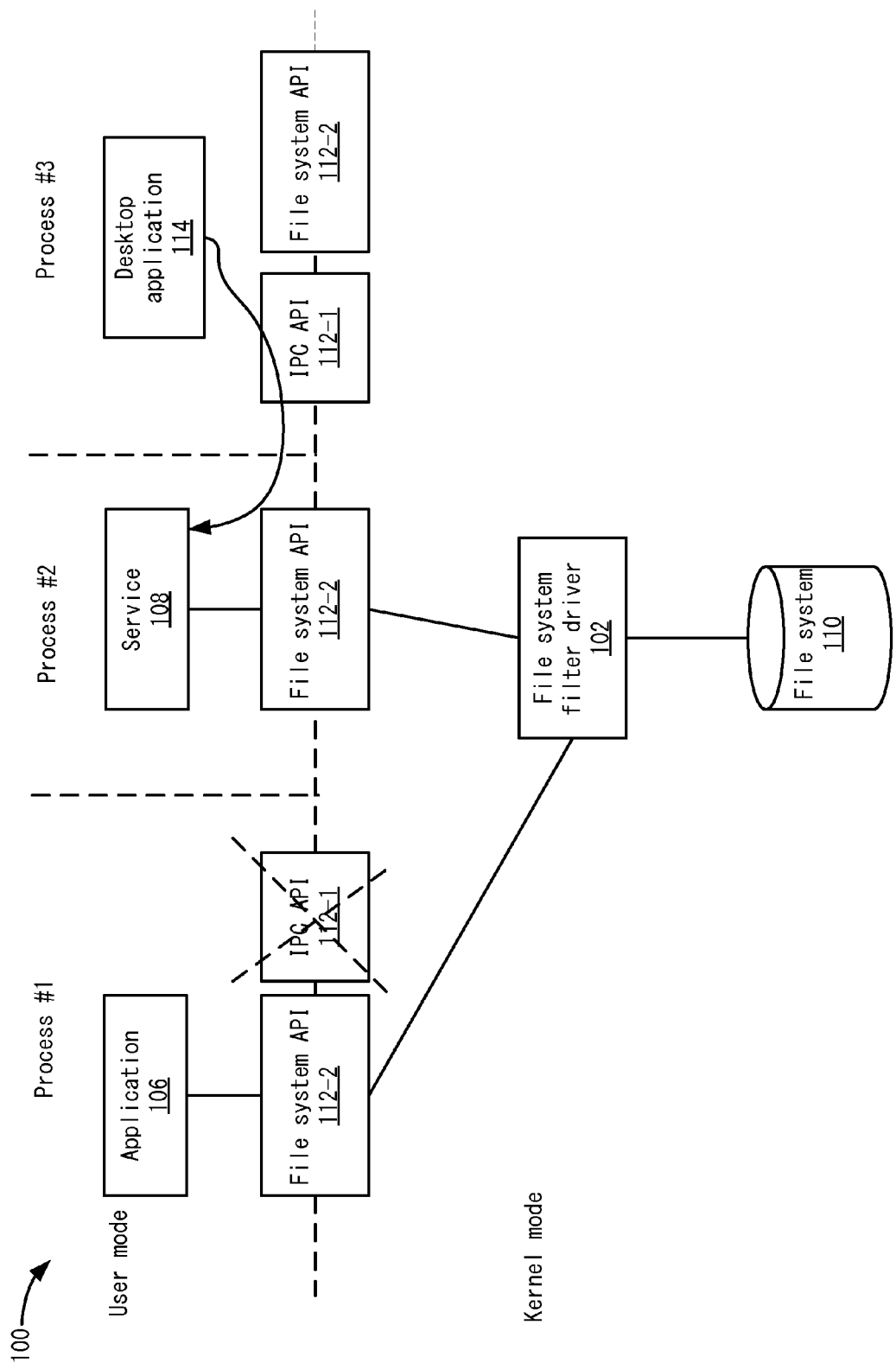
FIG. 1 depicts a simplified system for allowing inter-process communication (IPC) between processes using a file system filter driver according to one embodiment.

FIG. 1 depicts a simplified system 100 for allowing inter-process communication (IPC) between processes using a file system filter driver 102 according to one embodiment. System 100 may be operating on one or more computing devices. For illustrative purposes, three processes are shown as being run on a computing device. However, the computing device may not be running all of the processes (i.e., process #3 is being shown for illustrative purposes). A first process #1 may be running an application 106 and a second process #2 may be running a service 108. Application 106 may be running in an environment that restricts inter-process communication. For example, an inter-process mechanism, such as an inter-process communication application programming interface (IPC API), is not available to application 106. This restriction is shown conceptually in FIG. 1 by an inter-process communication (IPC) API 112-1 being "X'ed" out for process #1. In reality, IPC API 112-1 is not available to process #1. Although the inter-process communication API for first process #1 is restricted, IPC API 112-2 may not be restricted for another process. For example, other applications, such as desktop application 114, that are running in another process (e.g., process #3) may have access to IPC API 112-1 in a less restricted environment. Because desktop application 114 has access to IPC API 112-1, desktop application 114 may communicate in an inter-process communication with process #2 through IPC API 112-1. To overcome the inter-process communication restriction for application 106, particular embodiments allow application 106 to communicate with service 108 through file system filter driver 102 even though application 106 may be running in an environment that restricts inter-process communication.

In one embodiment, application 106 runs in an environment referred to as a sandbox that includes restrictions on inter-process communication. For example, application 106 may be a specialized application, such as a "Metro App" in Windows 8™. Metro Apps have a standard set of APIs that can be used. If Metro Apps are written with APIs outside of the standard set, then the Metro App would not be certified to run as a Metro App. Although Metro Apps are described, other applications that include restrictions on inter-process communication may also be appreciated, such as custom applications that cannot perform inter-process communication. As described above, APIs that allow inter-process communication are not accessible through the sandbox in which application 106 is running. Due to being in the restricted sandbox, application 106 cannot communicate with service 108 using inter-process communication API 112-1.

Particular embodiments leverage APIs that are included in the sandbox to perform inter-process communication. For example, application 106 has access to another API that allows application 106 to communicate with another entity, such as file system filter driver 102. In one example, the sandbox provides file system API 112-2 to allow application 106 to communicate with file system filter driver 102. Normally, application 106 uses file system API 112-2 to send input/output (I/O) commands, such as open/close/read/write commands, to a file system 110. File system filter driver 102 is a driver that is used to intercept commands to a file system 110 before the commands reach file system 110. File system filter driver 102 is a driver that receives communications from all processes/sandboxes. Thus, using file system filter driver 102 is ideal to allow inter-process communication for processes that are operating in a restricted sandbox because file system driver 102 will most likely be able to receive communications from a process no matter what restrictions are imposed on the sandbox. This is because most processes are enabled with access to the file system.

Normally, file system filter driver 102 can extend or replace functionality for the commands, and then the request is forwarded to file system 110. Traditionally, file system filter driver 102 may have included anti-virus filters, back-up agents, and encryption products that performed respective functionality on the commands. However, as will be described in more detail below, file system filter driver 102 redirects commands from application 106 to another process instead of sending the commands to file system 110. For example, file system filter driver 102 can redirect commands to service 108 through another file system API 112-2. In other embodiments, file system filter driver 102 may be an API other than another file system API 112-2, such as an IPC API, to communicate with service 108. Service 108 can then process the commands and return any results to file system filter driver 102, which can then return the results to application 106. Accordingly, using file system filter driver 102, application 106 can communicate with another process even though application 106 is restricted from inter-process communication with process #2. Also, because file system API 112-2 is part of the standard set of APIs available to application 106, application 106 may be certified to run as a specialized application, such as a Metro App, even though inter-process communication is being performed.

File system filter driver 102 can communicate with both application 106 and service 108 due to file system filter driver 102 running in a kernel mode. As is known, entities running in kernel mode may execute in the kernel, and entities, such as application 106, running in user mode operate in user space. The kernel mode is at a different privilege than the user mode where fewer restrictions are imposed on file system filter driver 102. This allows file system filter driver 102 to communicate with different processes. Because file system filter driver 102 runs at a different mode than application 106 and has less restrictions, file system filter driver 102 is able to redirect commands from application 106 to service 108.

Figure 2:
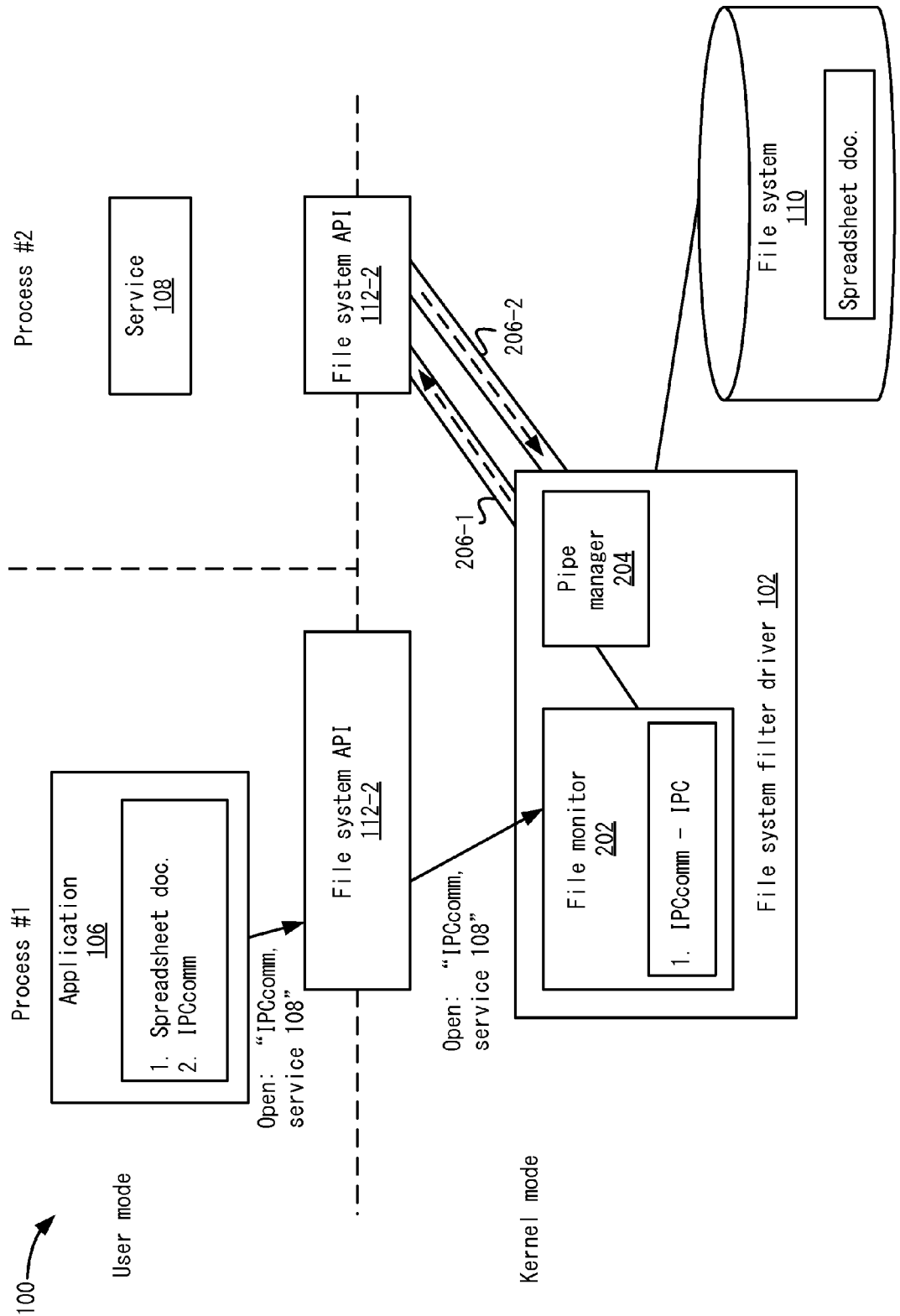
FIG. 2 depicts an example for initializing inter-process communication according to one embodiment.

In one embodiment, file system filter driver 102 enables inter-process communication by using one or more pipes to service 108. The process includes an initialization stage and a command processing stage. FIG. 2 depicts an example for initializing inter-process communication according to one embodiment. Application 106 may have one or more files that are defined for inter-process communication. For example, application 106 includes a list of files, some of which may be actual files that application 106 can access in file system 110 and some of which are used to indicate that inter-process communication is desired. For example, the list includes a file "Spreadsheet document (doc.)" and "IPCcomm". The file Spreadsheet document is a regular file and a corresponding file is stored in file system 110. Application 106 may send I/O commands for the file Spreadsheet document to file system filter driver 102, which then sends the command to file system 110. For example, application 106 may send a command to open the file Spreadsheet document.

Application 106 may also send a command using the file name "IPCcomm", such as "Open: IPCcomm, service 108". The command sent by application 106 may use file system semantics, such as open, close, read, and write to a file name. For example, the "open" command is used to initialize pipes, the "read" and "write" commands are used to have commands performed, and the "close" command is used to release a pipe. File system filter driver 102 intercepts the command and recognizes the command as a command for an inter-process communication rather than a command for file system 110. In this case, application 106 and file system filter driver 102 have been pre-configured to use the file name IPCcomm when inter-process communication is desired. In one example, application 106 and file system filter driver 102 may be manufactured by the same company, which can define the file names to use for inter-process communication. Also, a configuration process may be performed to configure both application 106 and file system filter driver 102 with the file names for inter-process communication. Also, because the file name IPCcomm is used for inter-process communication, the file may not be resident in file system 110.

In one example, a file monitor 202 monitors for commands directed to the defined file names. For example, when application 106 sends a command "Open IPCcomm, service 108", file monitor 202 intercepts the request. File monitor 202 knows that this command is for an inter-process communication due to the file name of IPCcomm being pre-defined and stored. File monitor then forwards the command to a pipe manager 204. File monitor 202 may not redirect commands to pipe manager 204 that are not to pre-defined file names for inter-process communication. Rather, file monitor 202 forwards the commands to file system 110.

Pipe manager 204 manages pipes to other processes, such as service 108. In this case, pipe manager 204 interprets the Open command as a command to initialize an outbound pipe 206-1 and an inbound pipe 206-2. Also, the specification of "service 108" in the command indicates to pipe manager 204 that outbound pipe 206-1 and inbound pipe 206-2 should be mapped to service 108. Other ways of specifying which service to use may be appreciated. For example, file names may be associated with specific services. In one example, the file name IPCcomm is specific to service 108 and another file name IPCsecondcomm is specific to a second service. In this way, application 106 does not need to specify the service.

Pipe manager 204 uses outbound pipe 206-1 to send commands to service 108 and uses inbound pipe 206-2 to receive results of the processing of the commands by service 108. In one embodiment, outbound pipe 206-1 may be a first-in first-out (FIFO) or file that is written to by pipe manager 204 and read by service 108. Inbound pipe 206-2 may be a FIFO or file that is written to by service 108 and read by file manager 204. Outbound pipe 206-1 and inbound pipe 206-2 may be "named pipes", which are pipes that persist and can be used by multiple different processes to communicate with service 108. Although outbound pipe 206-1 and inbound pipe 206-2 are referred to separately, it will be understood that outbound pipe 206-1 and inbound pipe 206-2 may be part of the same entity.

Figure 3:
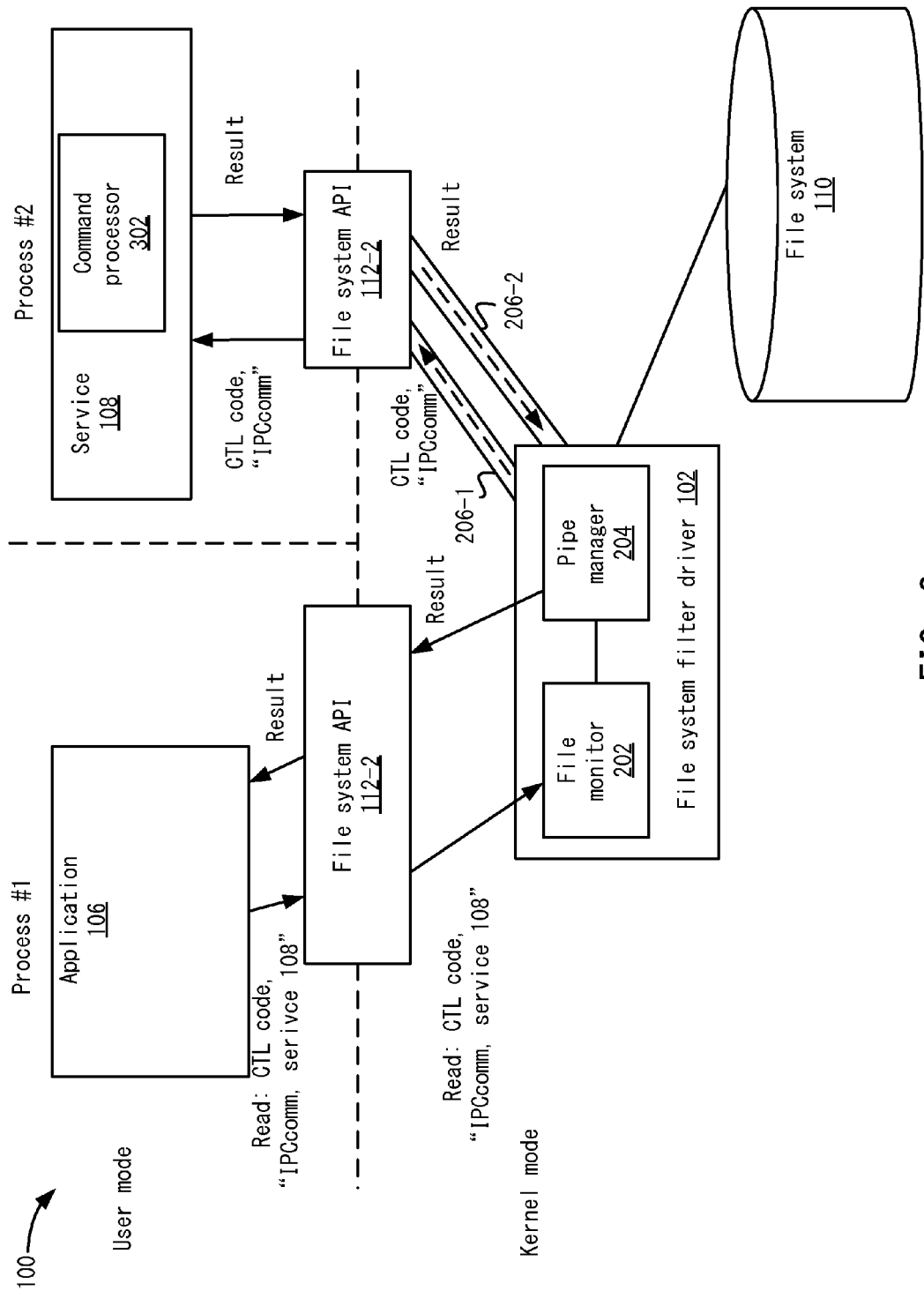
FIG. 3 depicts an example for performing commands according to one embodiment.

After initiation of pipes 206, application 106 can send commands to service 108 using the file name. FIG. 3 depicts an example for performing commands according to one embodiment. Application 106 may send a write or read command, such as "Read: CTL code, 'IPCcomm, service 108'" directed to file name IPCcomm and service 108.

File monitor 202 is once again monitoring for commands directed to file name IPCcomm. When the command is received, file monitor 202 intercepts the command and passes the command to pipe manager 204. Pipe manager 204 can then send the command through outbound pipe 206-1. For example, pipe manager 204 may write the command to a FIFO. A command processor 302 in service 108 may be monitoring outbound pipe 206-1 and receives the command.

Service 108 is running in second process #2 and can perform a service not offered by application 106. For example, service 108 may be a Win32 service, which are services provided by the Windows 8 operating system. Service 108 may also be other services, such as applications (e.g., word processing applications). Service 108 may also be running in user mode. However, service 108 may run in an environment that has fewer restrictions than application 106. For example, service 108 may have more access to more memory or APIs than application 106. Thus, service 108 may be able to perform different commands that are not allowed to be performed by application 106.

When service 108 receives the command, command processor 302 processes the command to produce a result. For example, the command may be to open a web page for application 106. Command processor 302 may open the web page and return a result (e.g., such as data for the web page or an acknowledgement). In one example, the command may include a control code (CTL code), such as an input/output control (IOCTL) code. Command processor 302 may interpret the control code to process the command. For example, different control codes correspond to different actions to perform.

Once command processor 302 processes the command, service 108 returns the result through inbound pipe 206-2. For example, service 108 may write the result to a FIFO by performing a write command, such as "Write: result, 'IPCcomm, application 106" directed to file name IPCcomm and application 106. Pipe manager 204 is monitoring the FIFO and receives the result. Pipe manager 204 can then forward the result to application 106 through file system API 112-2.

Figure 4:
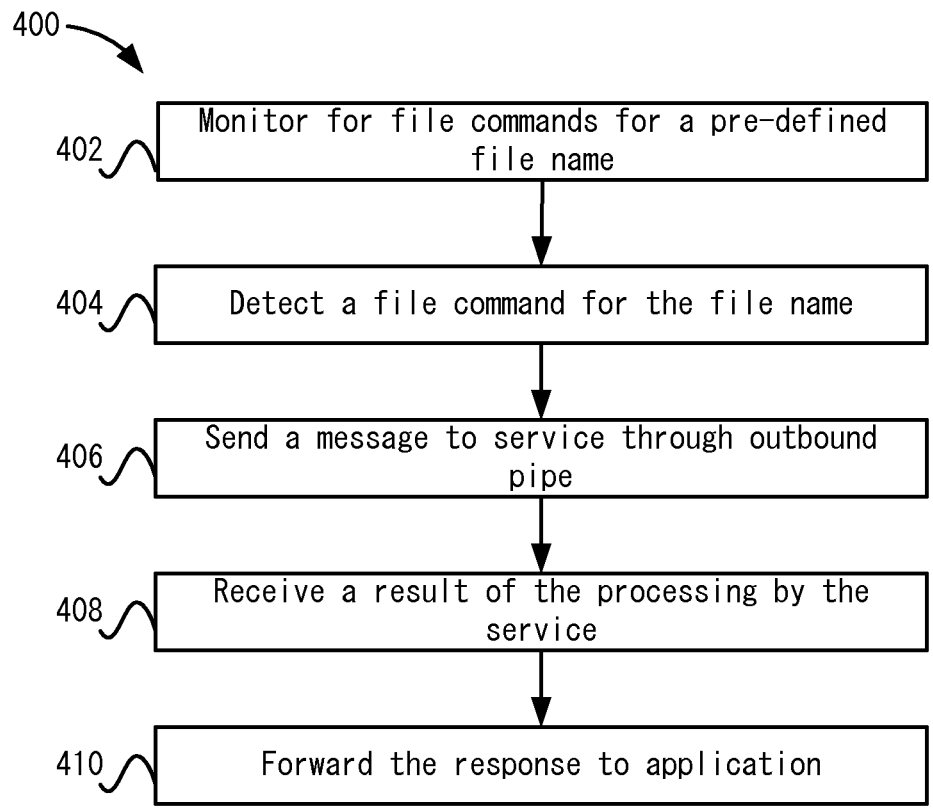
FIG. 4 depicts a simplified flowchart of a method for performing inter-process communication according to one embodiment.

FIG. 4 depicts a simplified flowchart 400 of a method for performing inter-process communication according to one embodiment. At 402, file system filter driver 102 monitors for file commands for a pre-defined file name. For example, different file names may be pre-defined as being for inter-process communication.

At 404, file system filter driver 102 detects a file command for the file name. File system filter driver 102 intercepts the file commands when they are directed to the file name as being for an inter-process communication.

At 406, file system filter driver 102 sends a message to service 108 through outbound pipe 206-1. Service 108 then processes the command by performing the service requested.

At 408, file system filter driver 102 receives a result of the processing by service 108. At 410, file system filter driver 102 can then forward the response to application 106.

Figure 5:
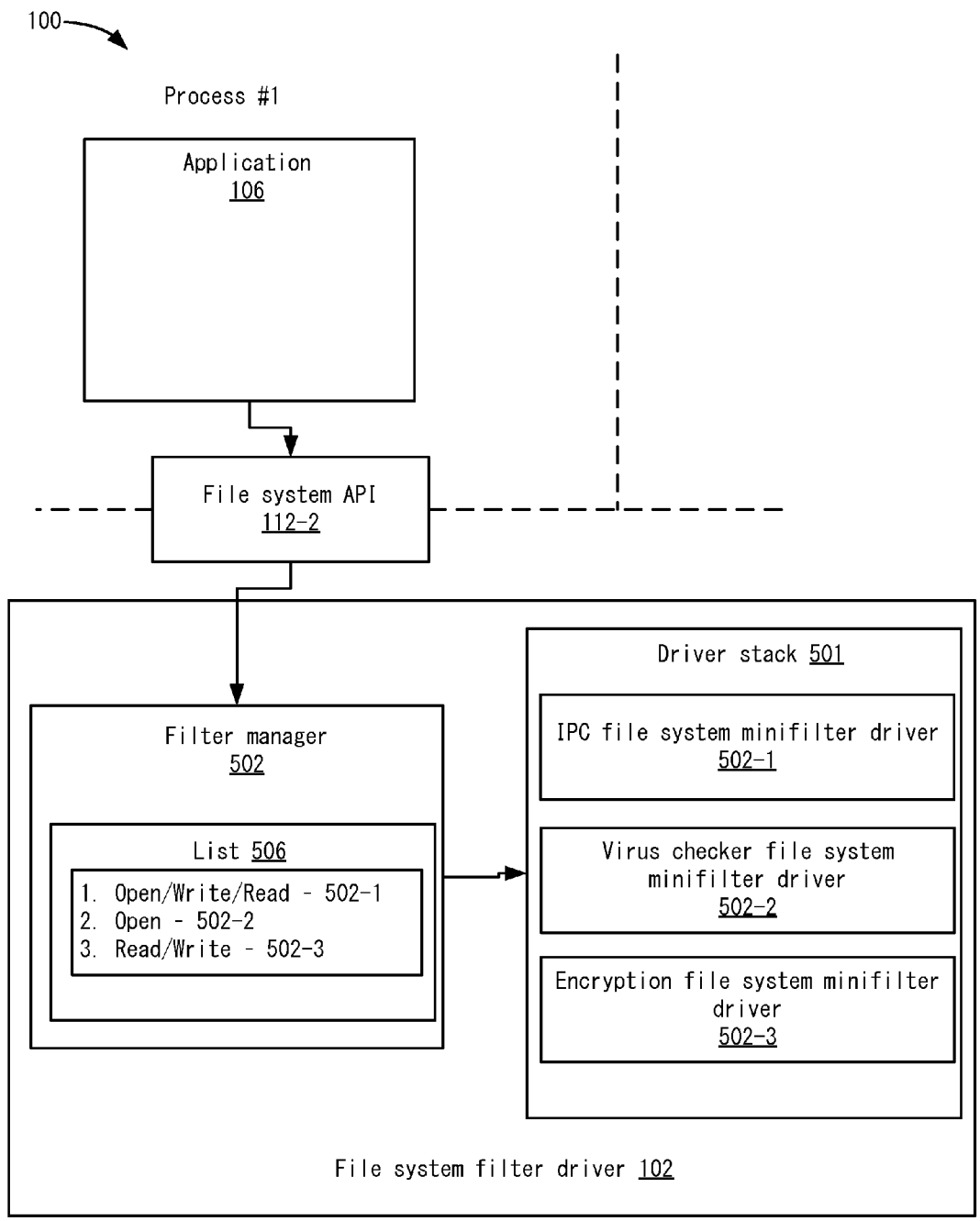
FIG. 5 depicts a more detailed example of the file system filter driver according to one embodiment.

FIG. 5 depicts a more detailed example of file system filter driver 102 according to one embodiment. An operating system may load file system minifilter drivers 502-1-502-3 into a driver stack 501. File system minifilter drivers 502-1-502-3 allow functions to be added to file system 110. For example, a virus checker file system minifilter driver 502-2 performs virus checking for the commands and an encryption file system minifilter driver 502-3 performs encryption services for the commands.

Particular embodiments provide an IPC file system minifilter driver 502-1 that performs functions as described above with respect to file system filter driver 102. In one example, a company creates IPC file system minifilter driver 502-1 to allow inter-process communications for applications when operating with the limited set of APIs in a sandbox as described above.

IPC file system minifilter driver 502-1 can register with a filter manager 504. In registering, IPC file system minifilter driver 502-1 can convey to filter manager 502 what types of I/O commands (or in another embodiment, types of files) IPC file system minifilter driver 502-1 is interested in. For example, IPC file system minifilter driver 502-1 indicates that open, read, and write I/O commands should be redirected to driver stack 501. The other mini filters also convey which types of I/O commands they are interested in to filter manager 502. For example, virus checker file system minifilter 502-2 registers open I/O commands and encryption file system minifilter 502-3 registers read or write I/O commands. File manager 502 stores the I/O types in a list 506.

As discussed above, application 106 sends commands through file system API 112-2. A filter manager 502 receives and parses the commands. Filter manager 502 then determines if any mini-filters 504 are applicable for the command. For example, filter manager 502 maps a command of "Open IPCcomm" to IPC file system minifilter driver 502-1 due to the open I/O command being registered to IPC file system minifilter driver 502-1 in list 506. Similarly, the open command causes filter manager 502 to recognize the command as being applicable to virus checker file system minifilter 502-2.

Filter manager 502 then sends the command "Open IPCcomm" to driver stack 501. In one example, filter manager 502 sends the command to driver stack 501 where all mini drivers parse the command to determine if each of the drivers should perform a service on the command. In another example, filter manager 502 sends the command to IPC file system minifilter driver 502-1. For example, filter manager 502 executes a callback to IPC file system minifilter driver 502-1 with the command. IPC file system minifilter driver 502-1 can then process the command as described above. For example, IPC file system minifilter driver 502-1 sends the command through outbound pipe 206-1 to service 108 and receives a result through inbound pipe 206-2. IPC file system minifilter driver 502-1 returns the result to filter manager 502 in returning from the callback. Filter manager 502 then sends the result to application 106.

Figure 6:
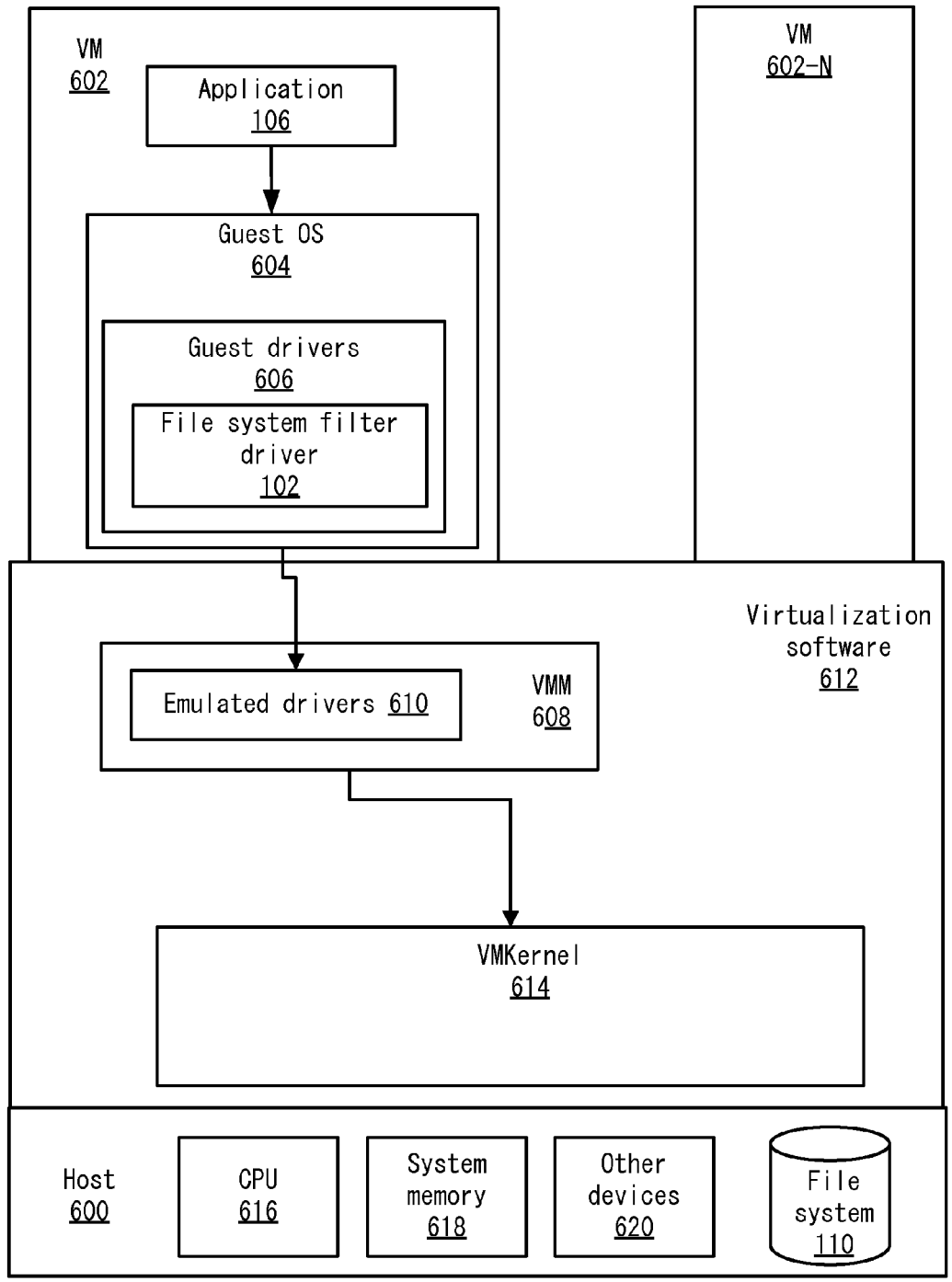
FIG. 6 depicts a computer system for allowing inter-process communication according to one embodiment.

FIG. 6 depicts a virtualized computer system for allowing inter-process communication according to one embodiment. Although a virtualization embodiment is described, particular embodiments may be used in both non-virtualization and virtualization environments. A host 600 includes a plurality of virtual machines 602-602-N that are abstracted by virtualization software 612 running on host 600. Virtualization software 612 includes a VM kernel 614 and virtual machine monitors (VMMs) 608 for each VM 602. Other virtualization configurations may also be appreciated. Host 600 includes physical devices including a computer processing unit (CPU) 616, system memory 618, file system 110, and various other devices 620. Other physical devices may also be appreciated.

Each virtual machine 102 includes a guest operating system (OS) 604. Guest OS 604 also includes guest drivers 606, which include file system filter driver 102. Virtualization software 104 emulates the drivers for VMs 102 using emulated drivers 610. For example, the emulated drivers 610 include a file system filter driver, which emulates corresponding file system filter driver 102.

In one example, when application 106 uses file system filter driver 102 to communicate with another process in VM 602, file system filter driver 102 in guest drivers 606 performs the communication within VM 602. When communication with another process running on another VM 602-N is required, file system filter driver 102 communicates with an emulated file system filter driver in VMM 608 to have the communication routed to another VM. When accessing file system 110 to access a file, file system filter driver 102 also communicates with an emulated file system driver and VMKernel 614 as is known in the art.

Accordingly, particular embodiments allow inter-process communication for application 106 that may be executing in an environment, such as sandbox, that restricts inter-process communication. Application 106 uses APIs that are allowed in the environment to communicate with another process. However, the operating system does not know that application 106 is communicating with another process due to the redirection by file system filter driver 102.

The various embodiments described herein may employ various computer-implemented commands involving data stored in computer systems. For example, these commands may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any commands described herein that form part of one or more embodiments may be useful machine commands. In addition, one or more embodiments also relate to a device or an apparatus for performing these commands. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required commands. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization commands may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, commands or structures described herein as a single instance. Finally, boundaries between various components, commands and data stores are somewhat arbitrary, and particular commands are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for allowing an application running in a first process to communicate with a second process, the method comprising:

receiving, at a file system filter driver, a command from the application for a file through a file system interface while the application is restricted from using all available inter-process interfaces for an inter-process communication with the second process by an operating system restriction, the file system filter driver configured to process file system commands, wherein the application is running in a user mode and the file system filter driver is running in a kernel mode;

determining, by the file system filter driver, that the command is for an inter-process communication with a service running in the second process based on the command being for the file;

sending, by the file system filter driver, the command to the service running in the second process, wherein the command is processed by the service, wherein the service is running in the user mode;

receiving, at the file system filter driver, a response from the service based on the command being processed by the service; and sending, by the file system filter driver, the response to the application.

2. The method of claim 1, wherein the application running in the first process includes a restriction for the inter-process communication with the second process.

3. The method of claim 2, wherein an inter-process interface is available to another process running without the restriction for the inter-process communication.

4. The method of claim 1, further comprising:
receiving the command at the file system interface; and
forwarding the command to the file system filter driver.

5. The method of claim 1, further comprising:
initializing one or more pipes to the service running in the second process;
mapping the file to the one or more pipes;
sending the command to the service through the one or more pipes; and
receiving the response from the service through the one or more pipes.

6. The method of claim 1, wherein the file is a pre-defined file name in which the file system filter driver is configured to recognize that the application is requesting the inter-process communication by referencing the file name in the command.

7. The method of claim 1, further comprising:
receiving a registering of a type of command from a file system minifilter driver of the file system filter driver, the registering indicating an interest in the type of command for the file system minifilter driver; and
forwarding any commands for the type of command to the file system minifilter driver, wherein the file system minifilter driver sends the commands to other processes.

8. The method of claim 1, wherein the command is a file system command using file system semantics.

9. The method of claim 1, wherein the command is not processed as a file system communication to a file system.

10. A non-transitory computer-readable storage medium containing instructions for allowing an application running in a first process to communicate with a second process, the instructions, when executed, for controlling a computer system to be configured for:
receiving, at a file system filter driver, a command from the application for a file through a file system interface while the application is restricted from using all available inter-process interfaces for an inter-process communication with the second process by an operating system restriction, the file system filter driver configured to process file system commands, wherein the application is running in a user mode and the file system filter driver is running in a kernel mode;
determining, by the file system filter driver, that the command is for an inter-process communication with a service running in the second process based on the command being for the file;
sending, by the file system filter driver, the command to the service running in the second process, wherein the command is processed by the service, wherein the service is running in the user mode;
receiving, at the file system filter driver, a response from the service based on the command being processed by the service; and
sending, by the file system filter driver, the response to the application.

11. The non-transitory computer-readable storage medium of claim 10, wherein the application running in the first process includes a restriction for the inter-process communication with the second process.

12. The non-transitory computer-readable storage medium of claim 11, wherein an inter-process interface is available to another process running without the restriction for the inter-process communication.

13. The non-transitory computer-readable storage medium of claim 10, further configured for:
receiving the command at the file system interface; and
forwarding the command to the file system filter driver.

14. The non-transitory computer-readable storage medium of claim 10, further configured for:
initializing one or more pipes to the service running in the second process;
mapping the file to the one or more pipes;
sending the command to the service through the one or more pipes; and
receiving the response from the service through the one or more pipes.

15. The non-transitory computer-readable storage medium of claim 10, wherein the file is a pre-defined file name in which the file system filter driver is configured to recognize that the application is requesting the inter-process communication by referencing the file name in the command.

16. The non-transitory computer-readable storage medium of claim 10, further configured for:
receiving a registering of a type of command from a file system minifilter driver of the file system filter driver, the registering indicating an interest in the type of command for the file system minifilter driver; and
forwarding any commands for the type of command to the file system minifilter driver, wherein the file system minifilter driver sends the commands to other processes.

17. The non-transitory computer-readable storage medium of claim 10, wherein the command is a file system command using file system semantics.

18. The non-transitory computer-readable storage medium of claim 10, wherein the command is not processed as a file system communication to a file system.

19. An apparatus configured to allow an application running in a first process to communicate with a second process, the apparatus comprising:
one or more computer processors; and
a non-transitory computer-readable storage medium comprising instructions that, when executed, control the one or more computer processors to be configured for:
receiving, at a file system filter driver, a command from the application for a file through a file system interface while the application is restricted from using all available inter-process interfaces for an inter-process communication with the second process by an operating system restriction, the file system filter driver configured to process file system commands, wherein the application is running in a user mode and the file system filter driver is running in a kernel mode;
determining, by the file system filter driver, that the command is for an inter-process communication with a service running in the second process based on the command being for the file;
sending, by the file system filter driver, the command to the service running in the second process, wherein the command is processed by the service, wherein the service is running in the user mode;

receiving, at the file system filter driver, a response from the service based on the command being processed by the service; and sending, by the file system filter driver, the response to the application.

20. The apparatus of claim 19, wherein the application running in the first process includes a restriction for the inter-process communication with the second process.

* * * * *